United States Patent [19]

Sturm

[11] 4,455,043

[45] Jun. 19, 1984

[54] HOT GLASS HOLDING TOOL

[76] Inventor: Michael R. Sturm, 137 Ridgeway Dr., Bridgeport, W. Va. 26330

[21] Appl. No.: 380,116

[22] Filed: May 20, 1982

[51] Int. Cl.³ .............................................. B25J 1/02
[52] U.S. Cl. ...................................... 294/19 R; 294/1 R
[58] Field of Search ............. 294/19 R, 1 R; 269/908, 269/909; 81/3 G, 3.43; 65/274.1, 274.11

[56] References Cited

U.S. PATENT DOCUMENTS

| | | |
|---|---|---|
| 334,126 | 1/1886 | Mahoney et al. . |
| 606,736 | 7/1898 | Platt et al. ........................ 294/19 R |
| 1,263,668 | 4/1918 | Henshaw . |
| 2,564,897 | 8/1951 | Hahn ................................ 269/908 |
| 3,025,638 | 3/1962 | Krawetzke et al. . |
| 3,391,958 | 7/1968 | Furer . |
| 3,506,430 | 4/1970 | Oelke et al. . |
| 3,887,350 | 6/1975 | Jenkins . |
| 4,244,781 | 1/1981 | Heckman . |

Primary Examiner—James B. Marbert
Attorney, Agent, or Firm—Buell, Blendo, Ziesenheim & Beck

[57] ABSTRACT

A tool or other device for grasping or supporting articles blown or formed in hand glass factories without checking or breaking them by thermal shock comprising a frame of round metal rod structure with beads side-by-side so as to engage and support the article out of contact with the rod.

The glass engaging surfaces of the beads are shaped to provide a minimum area of contact between article and bead and the beads are preferably made of wood or solid carbonaceous material.

7 Claims, 9 Drawing Figures

HOT GLASS HOLDING TOOL

BACKGROUND OF THE INVENTION

Articles blown or formed in hand glass factories are typically grasped with a tool when the article is separated from a punty or blowpipe and is subsequently transferred in a metal carrying device to an annealing lehr or oven. These tools are necessarily made of metal. As the hot article may have a temperature of 900° F. to as much as 1500° F., depending on the thickness of the article wall and the time which has elapsed after the forming thereof, contact between the hot article and the metal tool forms check marks on the article or causes outright breakage. Check marks are visible lines or fractures in the wall of the ware and represent zones of weakness which may later cause the article to break. Thus an article so marked must be scrapped.

Various means have been employed to cover or coat the metal tools so as to insulate the ware from the ware handling tools. Many makers of glassware use asbestos in the form of pads or wrapping for that purpose. Asbestos, however, readily frays or wears out, breaking down into fibres which are a health hazard. It is the principal object of my invention to provide tools which do not utilize asbestos covering or wrapping and do not damage hot glassware.

APPLICANT'S SOLUTION TO THE PROBLEM

I have found that a tool formed of metal rod strung with beads of non-heat conducting material positioned side-by-side so as to engage and support the article out of contact with the rod handles hot glassware without damaging it. I have further found that the beads should be contoured so as to minimize the area of contact between bead and ware, that is to say, the contour of the bead in a plane including the rod is desirably higher at the center than at the bead edges. Preferably the beads are made of wood, or a solid carbonaceous material.

DESCRIPTION OF PREFERRED EMBODIMENT

Figure 1:
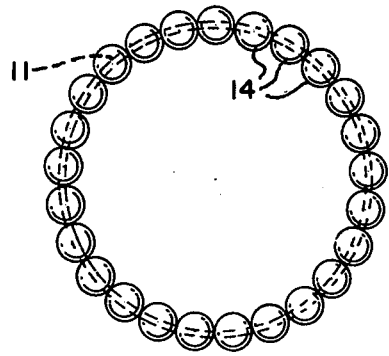
FIG. 1 is a plan of a ring tool of my invention.
Figure 2:
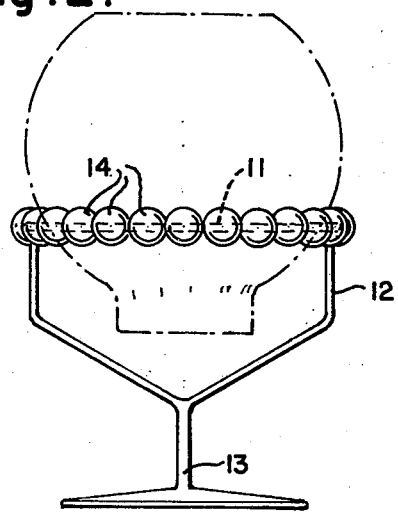
FIG. 2 is an elevation of tool of FIG. 1.
Figure 3:
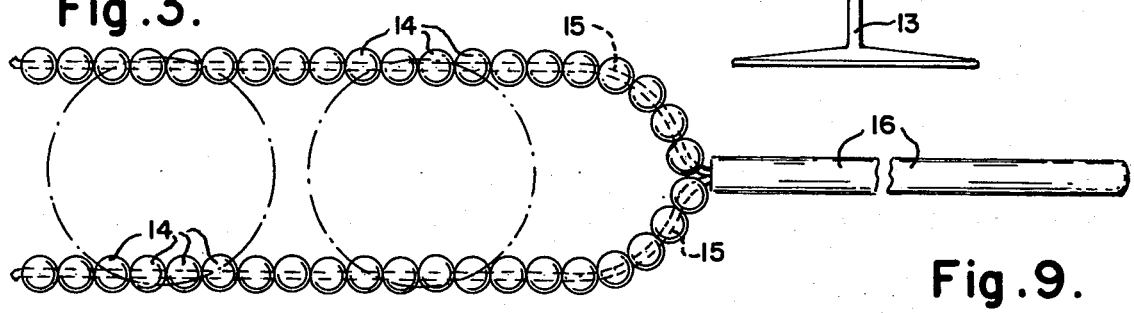
FIG. 3 is a plan of a carrying fork of my invention.
Figure 4:
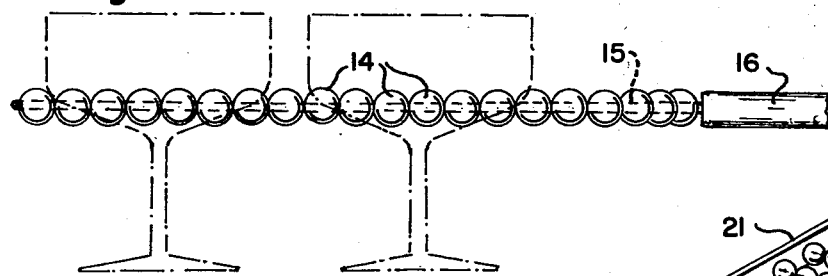
FIG. 4 is an elevation of the fork of FIG. 3.

The ring tool of FIGS. 1 and 2 comprises a ring 11 made of metal rod or wire, a stirrup support 12 having its ends fixed to ring 11 in a plane perpendicular to the ring and its base fixed to a stand or other support 13. On ring 11 are strung spherical beads 14 side-by-side around the ring so that a hot glass article resting within ring 11 is supported entirely by beads 14. Those beads are free to rotate on rod 11. The carrying fork of FIGS. 3 and 4 is similarly constructed, having a fork or stirrup 15 made of round metal rod or wire with a handle 16 affixed to its base. The tines of the fork 15 are strung with spherical beads 14, the ends of the fork tines being formed to hold the end beads thereon.

Figure 6:
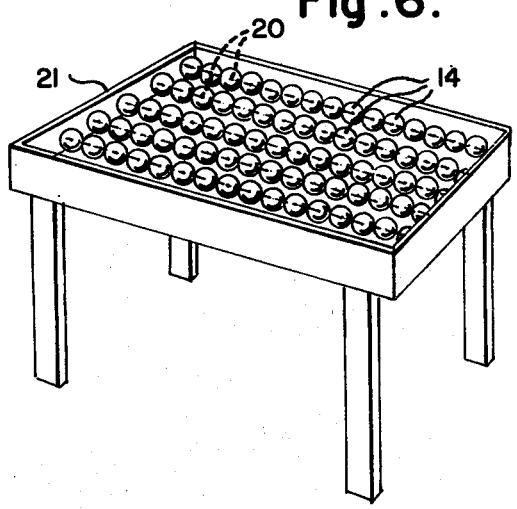
FIG. 6 is an isometric view of a crack-off stand of my invention.
Figure 5:
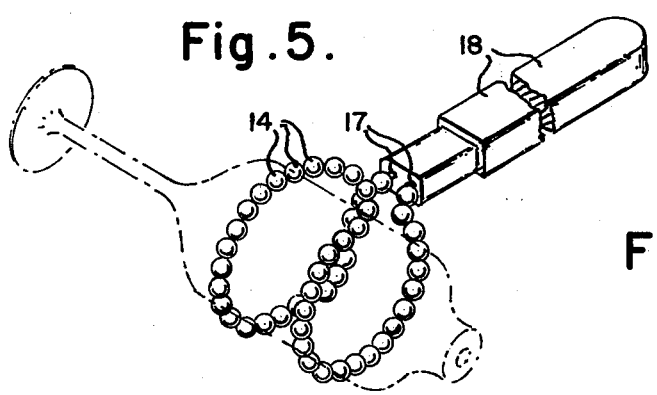
FIG. 5 is an isometric view of a spring tool of my invention.

The spring tool of FIG. 5 is formed from a loop of spring wire or rod 17 having its open ends bent back toward its closed end and affixed to a handle 18. The rod 17 is strung with spherical beads around its entire periphery so that an article held within the loop is in contact only with beads 14. The crack-off stand of FIG. 6 has an article supporting surface comprising parallel straight metal rods 20 fixed at their ends in a frame 21. Each rod is strung with beads 14 so that ware placed on the stand is supported entirely by those beads and does not come in contact with the rods.

Figure 9:
FIG. 9 is an elevation of a threaded type bead suitable for my invention.
Figure 8:
FIG. 8 is a longitudinal section of a sharp edge bead suitable for my invention.
Figure 7:
FIG. 7 is a longitudinal section of a rounded edge bead suitable for my invention.

The beads used in the embodiments of my invention above described may be spherical in shape, as are there described, but may also be shaped in other ways that result in a minimal area of contact between bead and ware. All the beads are circular in cross section on a plane normal to the bead axis, but their longitudinal sections on planes including the bead axis may have different contours. FIG. 7 is a longitudinal section through a bead in the shape of a torus, that is, its longitudinal section is substantially semi-circular at each end, the semicircles being connected by parallel straight lines. FIG. 8 is a longitudinal section of a sharp edged bead, that is, the section is V-shaped at each end and the V's are connected by straight parallel lines. The V's may be sharp or blunt. A single ead may consist of two or more axial portions each portion having a longitudinal section such as one of those above mentioned, or a single bead may be cylindrical with a threaded outer surface as is shown in FIG. 9.

The beads are preferably made of wood but they may also be made of other non-heat conducting materials such as graphite, or other solid carbonaceous material. The handles are also made of non-heat conducting material.

While I have shown and described a present preferred embodiment of the invention and have illustrated a present preferred method of practicing the same, it is to be distinctly understood that the invention is not limited thereto but may be otherwise variously embodied within the scope of the following claims.

I claim:

1. A tool for grasping and supporting blown or formed hot glass objects without checking or breaking them by thermal shock comprising a frame formed of round metal rod shaped to the object, a plurality of freely rotatable beads of non-heat conducting material strung on the rod in side-by-side relation so as to engage and support the object out of contact with the rod, the glass-engaging surfaces of the beads being shaped to minimize the area of contact between object and bead.

2. The tool of claim 1 in which the beads are formed of wood.

3. The tool of claim 1 in which the beads are formed of solid carbonaceous material.

4. The tool of claim 1 in which the beads are spherical in shape.

5. The tool of claim 1 in which the beads are in the form of a torus.

6. The tool of claim 1 in which the glass-engaging surfaces of the beads are of inverted V cross section.

7. The article of claim 1 including supporting means for the frame attached thereto formed of non-heat conducting material.

* * * * *